United States Patent [19]
Wolski et al.

[11] 3,943,804
[45] Mar. 16, 1976

[54] SPRING-LOADED LIVE CENTER

[75] Inventors: Francis Wolski, South Hadley, Mass.; Alan A. Zaremskas, 14, both of East Hartford, Conn.

[73] Assignees: Omer H. Schook; Alan A. Zaremskas, both of East Hartford, Conn. ; part interest to each

[22] Filed: June 21, 1974

[21] Appl. No.: 481,914

[52] U.S. Cl. ............................................ 82/33 R
[51] Int. Cl.² ...................................... B23B 23/04
[58] Field of Search .................................. 82/33 R

[56] References Cited
UNITED STATES PATENTS

| | | | |
|---|---|---|---|
| 2,463,385 | 3/1949 | Holohan | 82/33 |
| 2,564,256 | 8/1951 | Henderhan | 82/33 |
| 3,334,531 | 8/1967 | Fischer | 82/33 |

FOREIGN PATENTS OR APPLICATIONS

| | | | |
|---|---|---|---|
| 610,920 | 10/1948 | United Kingdom | 82/33 |

*Primary Examiner*—Leonidas Vlachos
*Attorney, Agent, or Firm*—Clarence A. O'Brien; Harvey B. Jacobson

[57] ABSTRACT

A spring-loaded live center formed by an adapter mounted on a ball bearing live center. The adapter includes a hollow locating housing arrangeable on the live center, a center slidably arranged in a central bore of the hollow housing, and a spring disposed within and extending from a recess provided in the center. The spring biases the center against the live center. A longitudinal groove and a wedge-shaped groove are provided in the center for permitting screws, and the like, disposed in holes provided in the housing to cooperate with the grooves and limit the sliding movement and to lock the center, respectively, relative to the housing.

1 Claim, 4 Drawing Figures

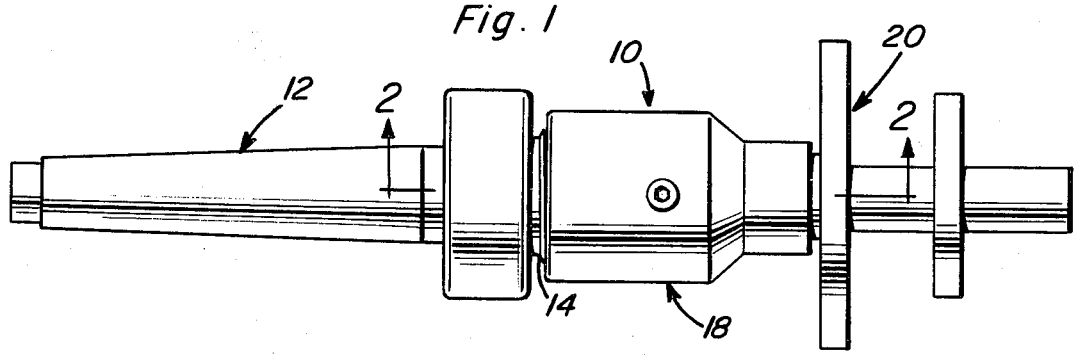
Fig. 1
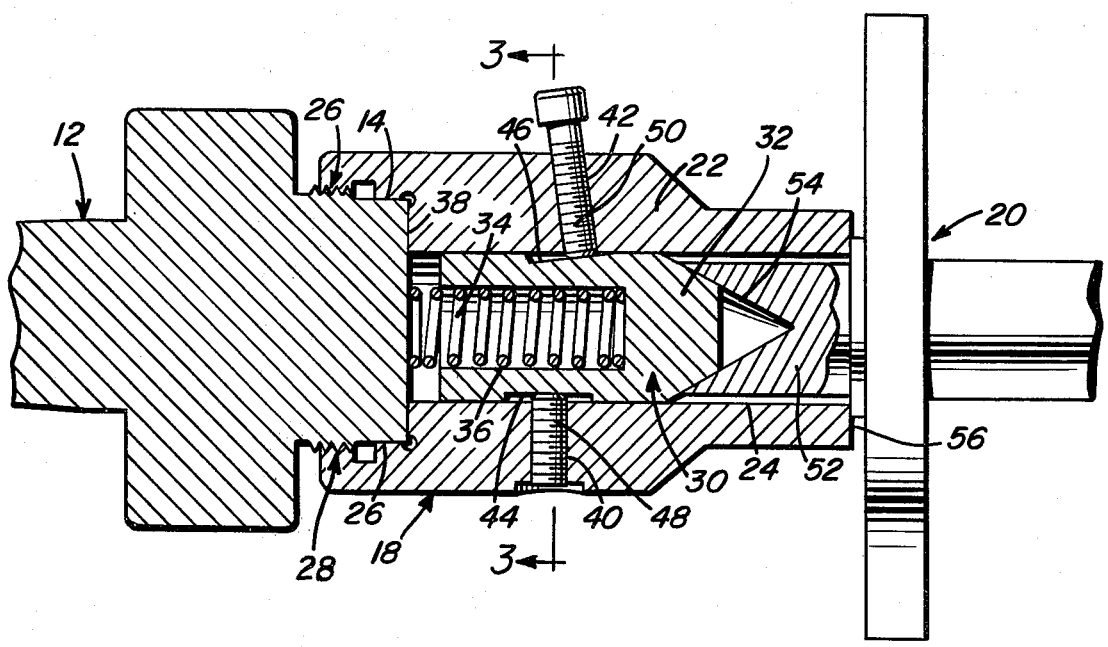
Fig. 2
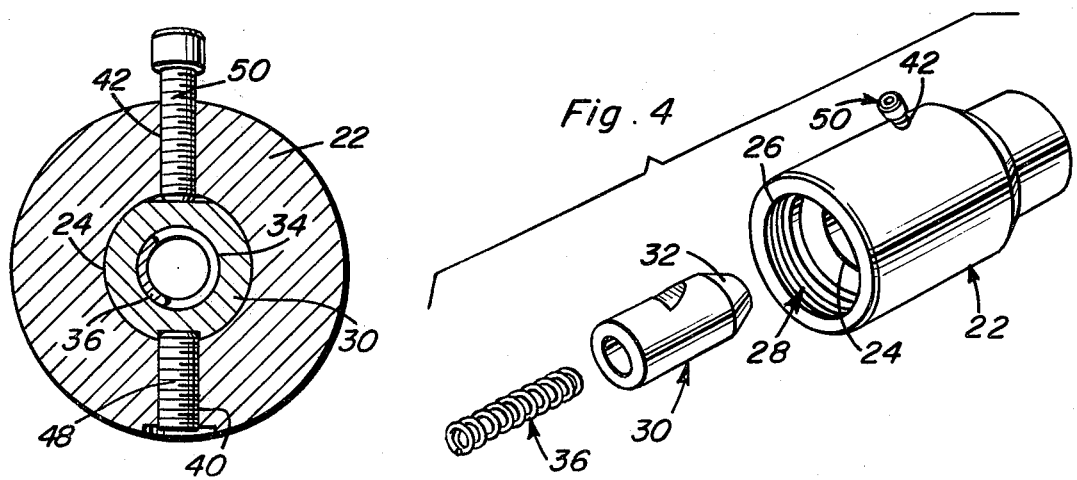
Fig. 3
Fig. 4

SPRING-LOADED LIVE CENTER

BACKGROUND OF THE INVENTION

1. Field of the Invention

This invention relates generally to a spring-loaded live center, and particularly to an adapter permitting the conversion of a standard ball bearing live center, and the like, to a spring-loaded live center.

2. Description of the Prior Art

Many O. D. grinders are provided with what is known as a dead head which has several disadvantages as compared to what is known as a live head. Basically, a dead head does not have a resilient feature while a live head is provided with a suitable spring to provide a resilient cushion. Thus, a grinder, and the like, provided with a live head is easier to set up, easier to operate, and is more accurate when grinding shoulder locations, groove locations, and the like.

Patents considered pertinent to this invention are as follows:

| | | |
|---|---|---|
| 994,581 | R. H. Fay | June 6, 1911 |
| 1,361,120 | G. Weatherby | Dec. 7, 1920 |
| 2,463,385 | B. A. Holohan | Mar. 1, 1949 |
| 2,971,413 | G. H. Rohm | Feb. 14, 1961 |
| 3,071,996 | G. H. Rohm | Jan. 8, 1963 |

SUMMARY OF THE INVENTION

It is an object of the present invention to provide a spring-loaded live center that will convert a dead head to a live head.

It is another object of the present invention to provide an adapter for converting a ball bearing live center, and the like, to a spring-loaded live center.

These and other objects are achieved according to the present invention by providing a spring-loaded live center formed by a ball bearing live center and an adapter which converts the ball bearing live center to a spring-loaded live center.

A preferred adapter, according to the present invention includes a hollow locating housing arrangeable on a live center. A center provided with a recess is slidably arranged in a center bore of the hollow housing, while a spring is arranged within the recess of the center so as to extend therefrom for abutting a surface of the associated ball bearing live center.

A pair of holes are advantageously provided in the housing so as to cooperatively match a longitudinal groove and a wedge-shaped groove provided in the center. By arranging elements such as screws in the holes in the housing so as ends of the elements extend into the grooves, the longitudinal groove will act to limit movement of the center within the housing and the wedge-shaped groove will act to lock the center against movement relative to the housing. In this manner, the center can be easily and accurately locked in a predetermined desired position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view showing a workpiece mounted in a spring-loaded live center according to the present invention.

FIG. 2 is a fragmentary, sectional view taken generally along the line 2—2 of FIG. 1, but drawn to a larger scale.

FIG. 3 is a sectional view taken generally along the line 3—3 of FIG. 2, but with the ball bearing live center removed.

FIG. 4 is an exploded perspective view showing an adapter according to the present invention which permits conversion of a ball bearing live center to a spring-loaded live center.

DESCRIPTION OF THE PREFERRED EMBODIMENT

Referring now more particularly to FIG. 1 of the drawings, a spring-loaded live center 10 according to the present invention is formed by a standard ball bearing live center 12 having a boss-like end which will be referred to herein as locating diameter 14. Conventional screw threads 16 (FIG. 2), and the like, are provided on locating diameter 14 for threadingly receiving mating threads provided on an adapter 18 which cooperates with live center 12 to convert same to a spring-loaded live center 10. A suitable workpiece 20 is shown mounted on adapter 18.

Referring now to FIGS. 2-4 of the drawings, adapter 18 includes a hollow locating housing 22 provided with a centrally arranged bore 24 and a counterbore 26 having internal screw threads 28. Counterbore 26 is arrangeable fitting over locating diameter 14, with the screw threads 28 provided in counterbore 26 cooperatively engaging with screw threads 16 provided on locating diameter 14 to retain housing 22 on live center 12.

A center 30 having a frusto-conical end 32 is provided in the other end thereof with a central recess 34. This center 30 is slidably arrangeable in bore 24 of housing 22. A conventional helical coiled spring 36, and the like, is arranged within recess 34 so as to extend therefrom for abutting at one end of the spring a face 38 forming part of locating diameter 14 of live center 12.

A pair of holes 40 and 42 are provided in housing 22. Although these holes 40, 42 are advantageously arranged in opposed, or 180 degree apart, relationship with respect to one another, the relationship of the holes with respect to one another is not critical. A longitudinal groove 44 is provided in center 30 and is arranged for matching with one of the holes 40, 42, hole 40 being illustrated in the drawings as so matched, while a wedge-shaped groove 46 is also provided in center 30 and is arranged for matching with the other of the holes 42, 40, hole 42 being illustrated in the drawings as so matched, when longitudinal groove 44 matches the one of the holes 40, 42. A pair of elements, such as the illustrated screws 48 and 50, are arranged in holes 40 and 42 for projecting into grooves 44 and 46. It will be appreciated that holes 40 and 42 should be provided with internal screw threads for cooperating with screws 48 and 50 to provide a threading engagement between the screws 48 and 50 and holes 40 and 42. When screw 48, which may be the illustrated setscrew, is arranged projecting into longitudinal groove 44, interaction between the tip of screw 48 and groove 44 acts to limit the length of travel of center 30 in bore 24 relative to housing 22. Projection of screw 50 into wedge-shaped groove 46 will act, in a known manner, to lock center 30 in a predetermined position relative to housing 22. It will be readily understood that the inclined abutment surface of groove 46 will prevent movement of center 30 toward face 38, and will resist by friction movement of center 30 toward workpiece 20. In this manner, a restraining arrangement is provided which will restrict movement of center 30 relative to housing 22, and simultaneously permit adjustment of center 30 in housing 22 to receive a projecting portion of a workpiece such as portion 52 of workpiece 20. The conical recess 54 of portion 52 permits reception of frusto-conical end 32 of center 30 in the workpiece. A substantially planar face 56 of housing 22 provides an abutment surface for workpiece 20.

As will be readily understood from the above description and from the drawings, the spring-loaded live center will permit a, for example, O. D. grinder (not shown) and the like provided with a dead head to operate like the grinder has a live head. This live head operation makes the grinder easier to set up, easier to operate, and more accurate when grinding shoulder locations, groove locations, and the like. Since the insertion of live center 12 into the grinder and the exact manner of clamping workpiece 20 into adapter 18 are performed in the conventional manner, the installation of a live center 10 according to the present invention into a grinder, and the like, will not be described herein.

It will be appreciated that the addition of spring 36 to live center 12 will result in a resilient "cushion" effect for workpiece 20 that effectively converts a dead head to a live head.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An adapter for converting a ball bearing live center to a spring-loaded live center, comprising, in combination:
    a. a hollow locating housing arrangeable onto a live center;
    b. said housing having a workpiece locating end face;
    c. a center provided with a recess and slidably arranged within the hollow housing;
    d. a spring arranged within the recess of the center and extending therefrom for abutting the live center;
    e. a pair of holes diametrically opposed to each other provided in the housing and communicating with the central bore of the housing;
    f. a longitudinal groove provided in the center and arranged for matching with one of the holes:
    g. a wedge-shaped groove provided in the center and arranged for matching with the other of the holes when the longitudinal groove matches the one of the holes;
    h. a pair of elements arranged in the holes for projecting into the grooves, one of the elements projecting into the longitudinal groove for limiting the length of travel of the center in the bore relative to the housing, and the other of the elements projecting into the wedge-shaped groove for locking the center in a predetermined position relative to the housing; and
    i. the housing is provided with a counterbore arranged for fitting over a boss-like end of the live center which forms a live center locating diameter, and with thread means arranged in the counterbore for engaging with cooperating locating diameter threads, the locating diameter forming a face against which the spring abuts.

* * * * *

UNITED STATES PATENT OFFICE
CERTIFICATE OF CORRECTION

PATENT NO. : 3,943,804
DATED : March 16, 1976
INVENTOR(S) : FRANCIS WOLSKI

It is certified that error appears in the above—identified patent and that said Letters Patent are hereby corrected as shown below:

In the heading, line 2: change "Inventors" to "Inventor"

lines 3 & 4: cancel "Alan A. Zaremskas, 14, both of East Hartford, Conn."

Signed and Sealed this

Sixth Day of July 1976

[SEAL]

*Attest:*

RUTH C. MASON
*Attesting Officer*

C. MARSHALL DANN
*Commissioner of Patents and Trademarks*